US008340050B2

(12) United States Patent
Schwarz

(10) Patent No.: US 8,340,050 B2
(45) Date of Patent: Dec. 25, 2012

(54) TRANSFER BETWEEN CELLS IN A COMMUNICATIONS SYSTEM

(75) Inventor: Uwe Schwarz, Veikkola (FI)

(73) Assignee: Nokia Corporation, Espoo (FI)

( * ) Notice: Subject to any disclaimer, the term of this patent is extended or adjusted under 35 U.S.C. 154(b) by 839 days.

(21) Appl. No.: 11/102,706

(22) Filed: Apr. 11, 2005

(65) Prior Publication Data

US 2006/0171359 A1  Aug. 3, 2006

(30) Foreign Application Priority Data

Jan. 28, 2005 (GB) .................................. 0501830.4

(51) Int. Cl.
*H04W 4/00* (2009.01)
(52) U.S. Cl. ...... 370/332; 370/331; 455/438; 455/435.1
(58) Field of Classification Search .................. 455/560, 455/561, 552.1, 436, 438, 443, 439, 435.1, 455/435.2, 437; 370/331, 332, 315, 333, 370/334

See application file for complete search history.

(56) References Cited

U.S. PATENT DOCUMENTS

| | | | |
|---|---|---|---|
| 5,826,188 A * | 10/1998 | Tayloe et al. ................. | 455/428 |
| 6,377,804 B1 | 4/2002 | Lintulampi | |
| 6,738,373 B2 * | 5/2004 | Turner .......................... | 370/352 |
| 6,992,999 B2 * | 1/2006 | Park et al. ..................... | 370/332 |
| 7,085,570 B2 * | 8/2006 | Tigerstedt et al. ............ | 455/439 |
| 7,162,247 B2 * | 1/2007 | Baba et al. .................... | 455/446 |
| 7,200,401 B1 * | 4/2007 | Hulkkonen et al. .......... | 455/438 |
| 7,206,604 B2 * | 4/2007 | Berra et al. ................... | 455/560 |
| 2001/0009543 A1 * | 7/2001 | Park et al. ..................... | 370/331 |
| 2002/0085514 A1 * | 7/2002 | Illidge et al. ................. | 370/329 |
| 2003/0083069 A1 * | 5/2003 | Vadgama ....................... | 455/436 |
| 2003/0207688 A1 * | 11/2003 | Nikkelen ...................... | 455/439 |
| 2004/0242260 A1 * | 12/2004 | Lescuyer ....................... | 455/525 |
| 2005/0026616 A1 * | 2/2005 | Cavalli et al. ................. | 455/436 |
| 2005/0075074 A1 * | 4/2005 | Benson et al. ............. | 455/67.11 |
| 2005/0096052 A1 * | 5/2005 | Csapo et al. .................. | 455/439 |
| 2005/0124345 A1 * | 6/2005 | Laroia et al. .................. | 455/437 |
| 2005/0153743 A1 * | 7/2005 | Berra et al. ................... | 455/560 |
| 2005/0227691 A1 * | 10/2005 | Pecen et al. ................ | 455/435.2 |

FOREIGN PATENT DOCUMENTS

| | | |
|---|---|---|
| CN | 1358038 A | 7/2002 |
| EP | 1 213 941 A2 | 6/2002 |
| WO | WO 2005/004507 A1 | 1/2005 |

OTHER PUBLICATIONS

International Search Report for PCT Application No. PCT/IB2006/000321; Date of Mailing Jun. 2, 2006.
Written Opinion—PCT Application No. PCT/IB2006/000321; Date of Mailing Jun. 2, 2006.
Office Action for Chinese Application No. 200680003304.7 dated Aug. 23, 2010.

* cited by examiner

*Primary Examiner* — Christian A Hannon
(74) *Attorney, Agent, or Firm* — Alston & Bird LLP

(57) ABSTRACT

A method for transferring user equipment from a current cell during an ongoing communication is disclosed. The current cell belongs to a first network. In the method capability information for at least one available cell of a second network is determined in a controller of the current cell, where after at least one cell of the second network is selected based on the capability information to prepare a transfer of the user equipment from the current cell. Information regarding the selected at least one cell of the second network is then sent from the controller to the user equipment.

31 Claims, 3 Drawing Sheets

TRANSFER BETWEEN CELLS IN A COMMUNICATIONS SYSTEM

BACKGROUND OF THE INVENTION

1. Field of the Invention

The present disclosure relates to transfer of a user equipment from a cell to another in a communications system.

2. Description of the Related Art

A communication system can be seen as a facility that enables communication sessions between two or more entities such as user equipment and/or other nodes associated with the communication system. The communication may comprise, for example, communication of voice, data, multimedia and so on. A user equipment connected to a communication system may, for example, be provided with a two-way telephone call or multi-way conference call or with a data connection. In addition voice call services, various other services, for example multimedia services or other data services, may be provided for a user. A user equipment may communicate packet data to and from a server entity, or between two or more user equipments.

A communication system typically operates in accordance with a given standard or specification which sets out what the various entities associated with the system are permitted to do and how that should be achieved. For example, the standard or specification may define if a user equipment is provided with a circuit switched service or a packet switched service or both. Communication protocols and/or parameters which shall be used for the connection are also typically defined. For example, the manner how the user equipment can access the communication system and how communication shall be implemented between the user equipment and the elements of the communication network is typically based on predefined communication protocols. In other words, a specific set of "rules" on which the communication can be based on needs to be defined to enable the user equipment to communicate via the communication system.

Communication systems proving wireless communication for user equipment are known. These systems are commonly referred to as mobile systems, although in certain systems the mobility may be restricted to substantially small areas. An example of the mobile systems is the public land mobile network (PLMN). Another example is a mobile system that is based, at least partially, on use of communication satellites. Mobile communications may also be provided by means of other types of systems, such as by means of wireless local area networks (WLAN).

In a typical mobile system the user equipment may communicate via a station of the communications, commonly referred to as a base station. A station provides user equipment with an access to the communication system. This access area provided by a base station is commonly referred to as a cell. A user equipment may be in wireless communication with two or more base stations at the same time. A user equipment may also be configured to communicate with base stations of different communication networks, i.e. are adapted for operation in multi-radio environments. Communication on the wireless interface between the user equipment and the base station(s) can be based on appropriate communication protocols.

The operation of the apparatus of an network is controlled by an appropriate control arrangement commonly including a number of various control entities with different functions. Control of the access network side (i.e. the cells) and the core network side of a network is typically separated.

Mobile users are provided with various services. The availability and use of different services is also believed to increase as the networks are improved to provide more data carrying capacity and features enabling service providers to offer even more sophisticated services.

An example of the services are the so called real-time services, for example video or audio or other services wherein data streaming is provided. Real-time services are expected to be increasingly popular amongst the users of mobile user equipment. Real-time service such as video streaming can be a high bitrate service that requires certain capability in the mobile user equipment and the network for enabling sufficiently high bitrates, which is generally more critical in the uplink from the user equipment to the base station. This data rate requirement is met based on different protocols and mechanisms in different networks. For example, the second generation (2G) GSM access systems can be upgraded by enhanced general packet radio service (EGPRS) capability to better meet the requirements for data streaming and so-called conversational traffic classes that have even tighter delay requirements than streaming services. Another option for enhancing the 2G is the dual-transfer mode (DTM) which provides a parallel 2G circuit switched and packet switched (CS, PS) service. The third generation (3G) systems, on the other hand, are commonly provided from the outset with a bitrate capacity that enables data streaming.

In order to make the introduction of the real-time services a success the services should work smoothly also in multi-radio environments, for example in environments wherein the data bearer may be provided by the 3G wideband code division multiple access (WCDMA) or 2G GSM. A critical point in providing the service is when there is a need to change the system, for example to transfer user equipment from a 3G WCDMA network to a 2G GSM network. This situation may occur for example when the mobile user equipment leaves a WCDMA cell or otherwise needs to be handed over from a 3G cell to a cell of another network.

Due to existing mechanisms such as routing area updates (RAU) and other factors the interruption time during which no user data can be transmitted is currently in the order of several seconds. Buffering of streaming data can to some extend bridge the interruption time. Buffering, however, may not be an appropriate long term solution, especially because the experienced interruption may be too much and as said conversational traffic has tighter delay requirements. Also, as the number of users increases the requirement for buffering capacity increases accordingly, and the buffering may not always be practical. A solution for the problem of providing a smooth service performance during a system change would also be beneficial because conversational services, i.e. voice calls, do not allow buffering.

Due to needed new hardware and associated cost when upgrading 2G GSM cells to EGPRS, some cells may remain GPRS-only enabled, either for quite some time or even for the remaining lifetime thereof. However, the radio network controller of the 3G cell is not by default aware about the neighboring 2G GSM cell capabilities. These capabilities may include capabilities such as the above referenced Enhanced GPRS (EGPRS) and dual-transfer mode (DTM), and so forth.

Therefore the radio network controller of the 3G cell may not be capable of ensuring that an handover of an EGPRS capable mobile user equipment or similar will occur directly to an appropriate, and preferably to the most suitable cell for the user equipment, for example to an EGPRS capable cell. If the mobile user equipment is handed over to a GPRS-only cell, it will need a new cell re-selection or handover procedure from the non-enabled cell to an EGPRS enabled cell. This increases the unwanted service interruption times significantly. The quality of real-time services like video streaming would suffer, especially if the GPRS cell cannot provide the required bitrate.

It is noted that the problem is not limited to mobile systems, but may occur in any communication environment wherein user equipment may nerd to be transferred to an access system of a different communications system.

SUMMARY OF THE INVENTION

Embodiments of the present invention aim to address one or several of the above problems.

According to one embodiment, there is provided a method for transferring user equipment from a current cell during an ongoing communication, the current cell belonging to a first network. In the method capability information for at least one available cell of a second network is determined in a controller of the current cell, where after at least one cell of the second network is selected based on the capability information for preparation of transfer of the user equipment from the current cell. Information regarding the selected at least one cell of the second network is then sent from the controller to the user equipment.

According to another embodiment, there is provided an access network controller for controlling user equipment in a cell of a first network during ongoing communication. The controller comprises processor means for determining capability information for at least one available cell of a second network based on system information and for selecting at least one cell of the second network based on the capability information for preparation of transfer of the user equipment from the current cell. An interface is provided for sending information regarding the selected at least one cell to the user equipment.

According to another embodiment, there is provided a communication system comprising a first network, a second network, and a controller for controlling user equipment in a cell of the first network during ongoing communication. The controller is configured to determine capability information for at least one available cell of the second network based on system information and to select at least one cell of the second network based on the capability information for preparation of transfer of the user equipment from the cell of the first network. The controller also informs the user equipment in the cell of the first network of the selected at least one cell of the second network.

In more specific embodiments selection of at least one cell of the second network comprises comparing capabilities of the user equipment and capabilities of at least one available cell. Determination of capability information may comprise determination of such cells that are provided with data streaming capability and/or that are capable of providing parallel circuit and packet switched services. Capability information may be comprises obtained from system information of the second network.

The embodiments are relatively easy to implement and may not require additional maintenance of information such as neighboring cell lists. Additional data transmission interruptions may be avoided. Service continuity may be improved, this being a significant improvement in the regards of real-time services.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Figure 1:
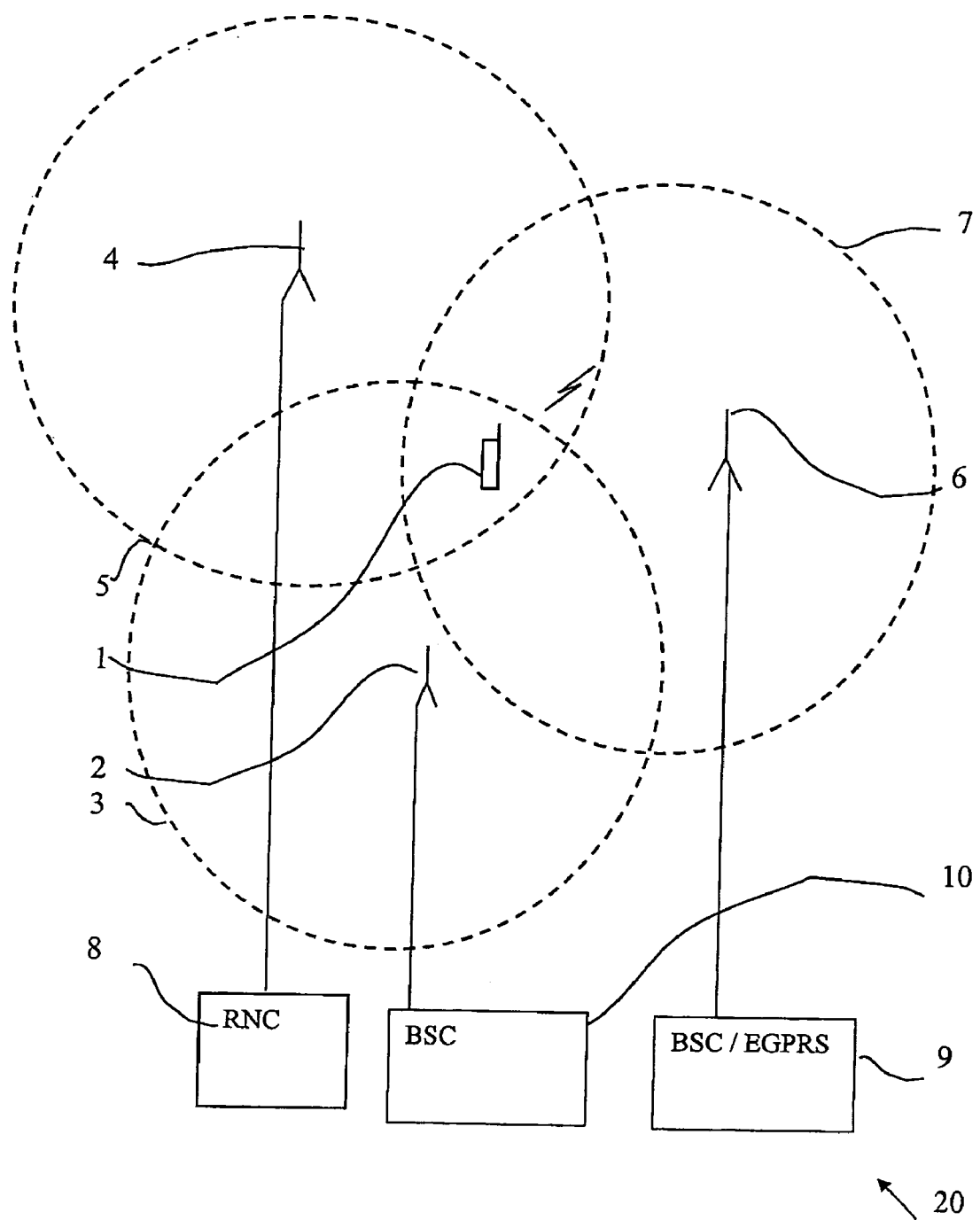
FIG. 1 shows a communication system wherein the present invention may be embodied.

A reference is first made to FIG. 1 illustrating a mobile communication system wherein the invention can be embodied. The underlying mobile communication system 20 of FIG. 1 may be provided by a plurality of mobile communication networks based on different standards. The network may be operated by one or different operators.

In a typical mobile communication network, for example the cellular public landline mobile network (PLMN), a number of cells 3, 5 and 7 is provided by means of base stations 2, 4 and 6. Each base station is arranged to wirelessly transmit signals to and receive signals from a plurality of mobile user equipment 1 (only one shown for clarity). The wireless communication between the user equipment and cells can be based on any appropriate communication protocol and access technology. Non-limiting examples include access based on systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

The multi-mode mobile user equipment 1 is able to transmit wireless signals to and receive signals from any of cells 3, 5 or 7. An appropriate user equipment is provided with required radio transmission elements and controller functions so that it is enabled to send and receive data from any of the networks, and process control instructions it may receive from or sent to the networks.

A mobile user equipment is able to move within a cell and also from one cell to another. In addition, a mobile user equipment may also be enabled to roam into another communication network of the mobile communication system. The basic principle of roaming is well known, and is not explained in here. What is important in view of the herein explained embodiment is that the user equipment 1 may roam into an area which is covered by cells 3 and 7, but not cell 5.

In a common wireless system an access network enables the user equipment to access the core part of a communication network that links the access network to other access networks or communication networks. Each access network is provided with at least one controller which may be connected to appropriate entities of the core network or networks. The core network is not shown.

Only three cells 3, 5 and 7, base stations 2, 4 and 6, and access network controllers 8, 9 and 10 are shown in FIG. 1 for clarity. For example, the third generation (3G) Wideband Code Division Multiple Access (WCDMA) networks cells are controlled by control entities known as radio network controllers (RNC). In the second generation (2G) GSM (Global System for mobile) the cells of the access network are understood to be controlled by base station controllers (BSC). The difference between the two GSM access systems of FIG. 1 is that the one controlled by BSC 9 is upgraded to provided EGPRS services whereas the access system controlled by BSC 10 is not.

In the herein described embodiment an EGPRS capable mobile user equipment 1 is moved in a 3G to 2G cell change, for example handover, directly to an EGPRS capable 2G cell

7. This is provided by means of a procedure that is based on inter-system network assisted cell change (IS-NACC) feature. The herein described embodiment is based on "misuse" of system information (SI) that the radio network controller of the 3G network is supposed only to forward to the mobile user equipment 1. More particularly, the IS-NACC feature can be used to make the RNC 8 aware of the capabilities of the neighboring 2G cells 3 and 5.

The inter-system network assisted cell change (IS-NACC) is commonly used for reducing the interruption break in an inter-system handover, i.e. in an handover occurring in a network. The idea of the IS-NACC feature is to provide the mobile user equipment with system information (SI) of the target cell generally via the core network. Although the radio network controller (RNC) and the base station controller (BSC) generally communicate over the CN, it is also possible for them to use a direct interface there between. Communication between the controllers, regardless the route, may save time when the mobile is reading the broadcast channel and thus reduces the transmission interruption time. This far the sole purpose of the IS-NACC feature has been to reduce interruption times during an inter-system cell change. Therefore the radio network controller (RNC) has had no reason to be configured to read and use in the current arrangements the system information given by the GSM, but the radio network controller only forwards the system information to the mobile user equipment.

In the herein described embodiment the data provided by a network assisted cell change mechanisms, such as an IS-NACC mechanism, is interpreted by the radio network system and used for a new purpose, that is for selecting a cell of another network for the mobile user equipment. By means of this the 2G cell capability information can be used already during the handover preparation process by the radio network controller 8 in the 3G domain for choosing a suitable, and preferably the most suitable 2G cell before the actual handover takes place. It is noted that a similar operation is possible for an intra-system change by means of a network assisted cell change (NACC) mechanism.

By using the EGPRS capability information of the GSM neighbour cell already during the inter-system handover preparation process, the radio network controller (RNC) 8 can command the EGPRS capable mobile user equipment 1 to register directly to the EGPRS enabled cell 7, if one is available. Thus a possible selection of the "inappropriate" cell 3 can be avoided.

Figure 2:
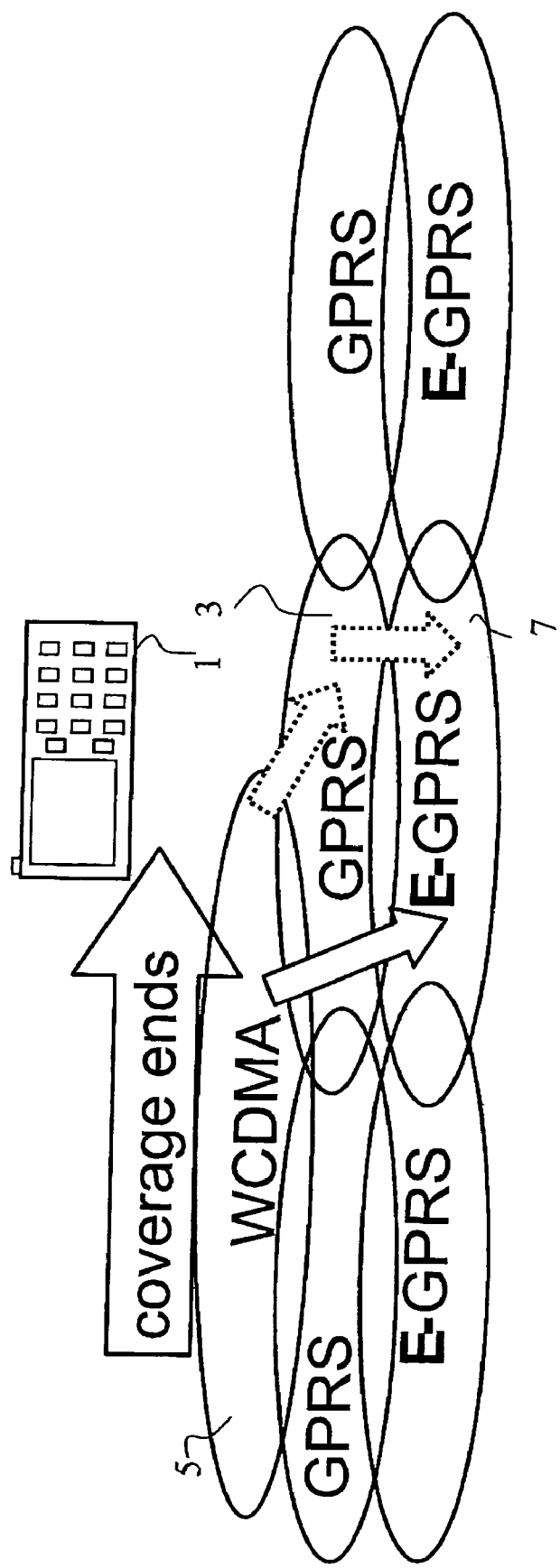
FIG. 2 shows an exemplifying scenario that is possible in multi-radio environment.

FIG. 2 illustrates the two possible ways user equipment 1 might enter the appropriate 3G cell 7. As shown by the dotted line arrows, it is possible for the user equipment 1 to attach first to the GPRS only cell 3, where after another handover to E-GPRS cell 7 is required. Instead of this, the user equipment can be "forced" to transfer itself directly to cell 7 as shown by the solid line arrow.

Figure 3:
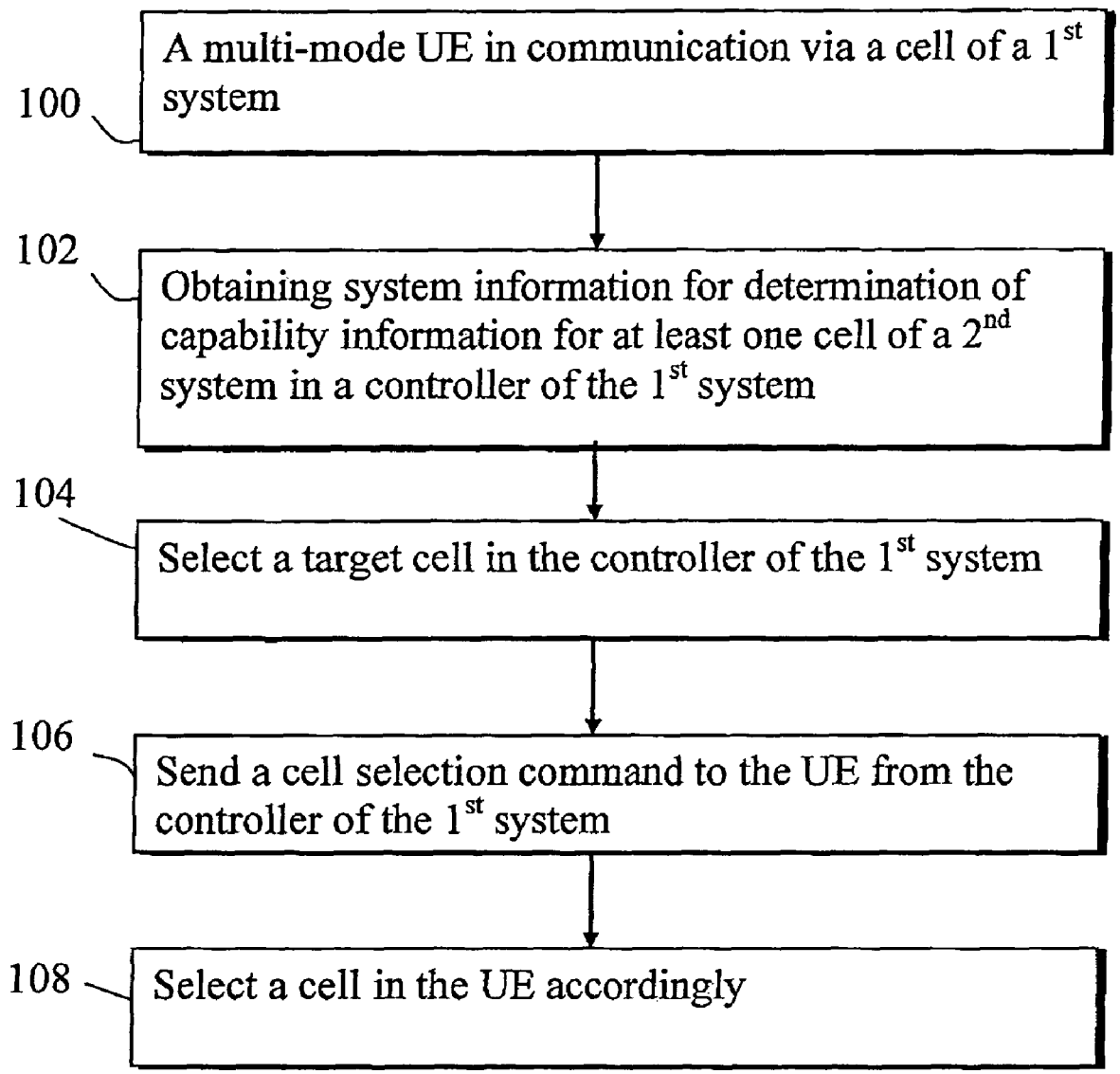
FIG. 3 is a flowchart illustrating an embodiment of the present invention.

An example of this is shown in the flow chart of FIG. 3. In step 100 a multi-mode user equipment is having a data streaming session via a cell of a 3G network. The 3G RNC obtains system information to find out GSM cell capabilities. The RNC may ask the BSC to send system information, where after the BSC answers the request with required information. A possible alternative for sending the system information on demand of RNC is that the BSC sends the information automatically, for example each time the system information changes. The system information is preferably obtained early enough so that is available for the handover preparation phase.

The radio network controller may then use the capability information obtained from the system information during a packet switched inter-system handover (PS-ISHO) preparation at step 104 for choosing the most suitable GSM cell. After the selection, the radio network controller can give a handover command to the mobile user equipment at step 106 with instructions regarding the new cell. In step 108 the user equipment may then directly register with a cell accordingly.

The selection may be based also on other factors, such as how the cell capabilities fit to capabilities of the user equipment, signal strength measurements, load and capacity, and so forth.

In a possible implementation the GSM neighbour cell capabilities may be already used during the inter-system compressed mode (CM) measurements, i.e. during the inter-system neighbour cell measurements. Measurement at an early stage may be advantageous since only one GSM neighbour may be fully measured with the knowledge of the identity of the base station, for example a BSIC (base station identity code). The identity code of the base station may need to be decoded before the user equipment can access the new cell, and therefore verification is preferably performed before the handover or other cell change command is given to the GSM/GPRS system. If the mobile user equipment is an EGPRS capable user equipment, the measured cells should preferably be an EGPRS cell, if available.

Information regarding dual-transfer mode of the neighbouring cells could be transferred in similar manner. The embodiments may also be used for matching of the capabilities of mobile user equipment and cell, for example when a circuit switched call or a circuit and packet switched call is on-going.

The required data processing functions may be provided by means of one or more data processors. Appropriately adapted computer program code product may be used for implementing the embodiments, when loaded to a computer, for example for performing the computations and requesting, interpretation and selection operations. The program code means are preferably be provided in a controller of a cell wherein user equipment is located before the transfer thereof is initiated. The program code product for providing the operation may be stored on and provided by means of a carrier medium such as a carrier disc, card or tape. A possibility is to download the program code product via a data network.

It is noted that whilst embodiments of the present invention have been described in relation to user equipment such as mobile stations, embodiments of the present invention are applicable to any other suitable type of user equipment.

It is also noted that the concepts of cell change and movement or transfer from a cell to another refer to any operation wherein user equipment is transferred from a cell to another, and thus refers to operations such as packet switched cell change, circuit switched handover and so forth.

It is noted that even though the exemplifying communication system shown and described in more detail in this disclosure uses the terminology of the $3^{rd}$ generation (3G) WCDMA (Wideband Code Division Multiple Access) networks, such as UMTS (Universal Mobile Telecommunications System) or CDMA2000 public land mobile networks (PLMN) and 2G GSM, embodiments of the proposed solution can be used in any communication system wherein advantage may be obtained by means of the embodiments of the invention. The invention is not limited to environments such as cellular mobile or WLAN systems either. What is required is that system level information of a first type of network can be used by a controller of another type network for selection of an access entity of the first type of network, and that the controller is enabled to command user equipment to choose a selected access entity. Thus the term cell is understood to refer broadly to an access entity that is provided by a communications network.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   receiving system information, in a controller of a current cell belonging to a first network, during an ongoing communication;
   determining, in the controller of the current cell, capability information for at least one available cell of a second network based on the system information;
   selecting, with the controller of the current cell and prior to obtaining inter-system compressed mode measurements, the at least one available cell of the second network based on the capability information by choosing a suitable at least one available cell for user equipment to prepare a transfer of the user equipment from the current cell;
   causing information regarding the selected at least one cell of the second network to be sent from the controller of the current cell to the user equipment; and
   initiating transfer of the user equipment from the current cell during the ongoing communication.

2. The method according to claim 1, wherein the selecting of the at least one available cell of the second network comprises comparing capabilities of the user equipment and the capabilities of the at least one available cell.

3. The method according to claim 1, wherein the determining of the capability information comprises determining in the controller of the current cell at least one target cell that supports a service of the user equipment that is to be handed over.

4. The method according to claim 3, wherein the determining of the available cells by the controller of the current cell comprises determining available cells that are enhanced general packet radio service or dual transfer mode enabled.

5. The method according to claim 1, wherein the determining of the capability information comprises determining in the controller of the current cell available cells of the second network providing parallel circuit and packet switched services.

6. The method according to claim 1, wherein the current cell comprises a cell of a third generation mobile communications system.

7. The method according to claim 1, wherein the determining of the capability information comprises obtaining the capability information from system information of the second network by the controller of the current cell.

8. The method according to claim 7, wherein the obtaining of the capability information comprises receiving the capability information in a network assisted cell change message.

9. The method according to claim 1, wherein the selecting of the at least one available cell of the second network further comprises considering the capability information with respect to matching of the cell capabilities to at least one of capabilities of the user equipment, signal strength, load and capacity.

10. The method according to claim 1, further comprising: using the capability information during inter-system neighbor measurements.

11. The method according to claim 1, wherein the ongoing communication comprises packet data communications.

12. The method according to claim 1, wherein the user equipment selects a new cell based on the information regarding the selected at least one available cell of the second network.

13. A computer-readable storage medium having a computer program embodied thereon, the computer program controlling a processor to perform a process, the process comprising:
   receiving system information, in a controller of a current cell belonging to a first network, during an ongoing communication;
   determining, in the controller of the current cell, capability information for at least one available cell of a second network based on the system information;
   selecting with the controller of the current cell and prior to obtaining inter-system compressed mode measurements, at least one available cell of the second network based on the capability information, by choosing a suitable at least one available cell for user equipment, to prepare a transfer of the user equipment from the current cell;
   causing information regarding the selected at least one available cell of the second network to be sent from the controller of the current cell to the user equipment; and
   initiating transfer of the user equipment from the current cell during the ongoing communication, the current cell belonging to the first network.

14. An apparatus comprising at least one processor and at least one memory including computer program code, the at least one memory and the computer program code configured to, with the at least one processor, direct the apparatus at least to:
   receive system information, in a current cell belonging to a first network, during an ongoing communication;
   determine capability information for at least one available cell of a second network based on the system information;
   select, prior to obtaining inter-system compressed mode measurements, the at least one available cell of the second network based on the capability information by choosing a suitable at least one available cell for user equipment to prepare a transfer of the user equipment from the current cell;
   cause information regarding the selected at least one available cell to be sent to the user equipment; and
   initiate transfer of the user equipment from the current cell of the first network during the ongoing communication.

15. The apparatus according to claim 14, wherein the apparatus is directed to interpret system information messages of the second network.

16. The apparatus according to claim 14, wherein the apparatus is further directed to determine at least one target cell that supports a service of the user equipment that is to be handed over.

17. The apparatus according to claim 16, wherein the apparatus is directed to determine available cells that are enhanced general packet radio service or dual transfer mode enabled.

18. The apparatus according to claim 14, wherein the apparatus is a radio network controller of a third generation mobile communications system.

19. An apparatus according to claim 14, wherein the apparatus is part of an access network controller, a base station controller, or a radio network controller.

20. The apparatus according to claim 14, wherein the apparatus is further directed to compare capabilities of the user equipment and the capabilities of at least one available cell when selecting the at least one available cell of the second network based on the capability information.

21. The apparatus according to claim 14, wherein the apparatus is directed to determine available cells of the second network providing parallel circuit and packet switched services.

22. The apparatus according to claim 14, wherein the current cell is a cell of a third generation mobile communications system.

23. The apparatus according to claim 14, wherein the apparatus is directed to obtain the capability information from system information of the second network.

24. The apparatus according to claim 23, wherein the apparatus is directed to obtain the capability information by receiving the capability information in a network assisted cell change message.

25. The apparatus according to claim 14, wherein the apparatus is directed to consider capability information regarding matching of the cell capabilities to at least one of capabilities of the user equipment, signal strength, load and capacity when selecting the at least one cell.

26. The apparatus according to claim 14, wherein the apparatus is directed to measure the capability information during inter-system neighbor measurements.

27. The apparatus according to claim 14, wherein the ongoing communication comprises packet data communications.

28. The apparatus according to claim 14, wherein the user equipment is configured to select a new cell based on the information regarding the selected at least one cell of the second network.

29. A system, comprising:
a first network;
a second network; and
a controller of a current cell of the first network,
wherein the controller is configured to control an user equipment in the current cell of the first network during an ongoing communication, and
wherein the controller is configured
to receive system information, in the current cell belonging to the first network, during the ongoing communication,
to determine capability information for at least one available cell of the second network based on the received system information,
to select, prior to obtaining inter-system compressed mode measurements, the at least one available cell of the second network based on the capability information by choosing a suitable at least one available cell for the user equipment to prepare a transfer of the user equipment from the current cell,
to initiate transfer of the user equipment from the current cell of the first network during the ongoing communication, and
to cause information regarding the selected at least one available cell of the second network to be sent to the user equipment.

30. An apparatus, comprising:
receiving means for receiving system information, in a controller of a current cell belonging to a first network, during an ongoing communication;
determining means for determining, in the controller of the current cell, capability information for at least one available cell of a second network based on the received system information;
selecting means for selecting, prior to obtaining inter-system compressed mode measurements, with the controller of the current cell the at least one available cell of the second network based on the capability information, by choosing a suitable at least one cell for user equipment, to prepare a transfer of the user equipment from the current cell;
means for causing information regarding the selected at least one available cell from the controller of the current cell to be sent to the user equipment; and
initiating means for initiating transfer of the user equipment from the current cell of the first network during the ongoing communication.

31. An apparatus according to claim 30, wherein the apparatus is part of an access network controller, a base station controller, or a radio network controller.

* * * * *